(12) United States Patent
Singh et al.

(10) Patent No.: US 12,573,176 B2
(45) Date of Patent: Mar. 10, 2026

(54) APPARATUSES AND METHODS FOR PROVIDING AND GENERATING STATISTICS FOR IMAGES WITH A FORMULAIC REPRESENTATION

(71) Applicant: NXP B.V., Eindhoven (NL)

(72) Inventors: Chanpreet Singh, Uttar Pradesh (IN); Stephan Matthias Herrmann, Markt Schwaben (DE); Sharath Subramanya Naidu, Munich (DE); Nikhil Sharma, Himachal Pradesh (IN); Maninder Kumar, Madison, WI (US); Sharath, Bangalore (IN)

(73) Assignee: NXP B.V. (NL)

( * ) Notice: Subject to any disclaimer, the term of this patent is extended or adjusted under 35 U.S.C. 154(b) by 375 days.

(21) Appl. No.: 18/175,589

(22) Filed: Feb. 28, 2023

(65) Prior Publication Data

US 2024/0212314 A1    Jun. 27, 2024

(30) Foreign Application Priority Data

Dec. 22, 2022    (IN) ............................. 202221074466

(51) Int. Cl.
| | |
|---|---|
| *G06K 9/00* | (2022.01) |
| *G06T 7/11* | (2017.01) |
| *G06V 10/50* | (2022.01) |
| *G06V 10/75* | (2022.01) |

(52) U.S. Cl.
CPC .............. *G06V 10/758* (2022.01); *G06T 7/11* (2017.01); *G06V 10/507* (2022.01)

(58) Field of Classification Search
CPC ................................ G06V 10/758; G06T 7/11
See application file for complete search history.

(56) References Cited

U.S. PATENT DOCUMENTS

| | | | |
|---|---|---|---|
| 7,689,051 B2 | 3/2010 | Mukerjee | |
| 9,843,813 B2 | 12/2017 | Cote et al. | |
| 10,579,334 B2 | 3/2020 | Lo et al. | |
| 10,643,297 B2 | 5/2020 | Mellempudi et al. | |
| 2005/0232501 A1* | 10/2005 | Mukerjee ............... | H04N 19/46 375/E7.161 |
| 2017/0102921 A1* | 4/2017 | Henry ..................... | G06F 7/57 |
| 2019/0313570 A1* | 10/2019 | Owechko ............. | A01B 79/005 |

FOREIGN PATENT DOCUMENTS

DE        102018110687 A1    11/2018

* cited by examiner

*Primary Examiner* — Molly Wilburn
*Assistant Examiner* — Aidan Keup

(57) ABSTRACT

Aspects of the subject disclosure may include, for example, splitting an image that is obtained from a video adaptor into a plurality of segments, for each segment of the plurality of segments, generating a value that is representative of data of the segment, the value resulting in no loss in an accuracy of the data, storing a first part of the value in a first portion of a memory, and storing a second part of the value in a second portion of the memory, the second part being different from the first part. Other embodiments are disclosed.

19 Claims, 5 Drawing Sheets

SPLIT IMAGE INTO SEGMENTS — 302

PERFORM MEASUREMENT ON PIXELS WITHIN A GIVEN SEGMENT — 304

STORE STATISTICAL REPRESENTATION IN FIRST MEMORY — 306

STORE INTERMEDIATE RESIDUES OF CALCULATIONS IN SECOND MEMORY — 308

300

100a

102b

```
Init: ResidueMem[] = 0
Init: StatMem[]    = 0
PrevBlkRow         = -1
Foreach pixel in image
    BlkIdx  = GetBlkIdx(Pixel)
    BlkRow  = floor(BlkIdx/NumBlkCols)
    BlkCol  = BlkIdx % NumBlkCols
    if (BlkRow!=PrevBlkRow)
        Init: ResidueMem[] = 0
    [iMant,exp] = StatMem[blkidx]
    Resi  =  ResidueMem[BlkCol]

CurrStat = ((iMant<<exp) | Resi
    /* Perform measurement */
    NextStat = Func( CurrStat,Image(Pixel) )
    ResidueMem[blkidx]   = NextStat & (2^exp -1)
    StatMem[BlkCol] = (NextStat & ~(2^exp-1)) | exp
end
```

SPLIT IMAGE INTO SEGMENTS — 302

PERFORM MEASUREMENT ON PIXELS WITHIN A GIVEN SEGMENT — 304

STORE STATISTICAL REPRESENTATION IN FIRST MEMORY — 306

STORE INTERMEDIATE RESIDUES OF CALCULATIONS IN SECOND MEMORY — 308

300

APPARATUSES AND METHODS FOR PROVIDING AND GENERATING STATISTICS FOR IMAGES WITH A FORMULAIC REPRESENTATION

FIELD OF THE DISCLOSURE

The subject disclosure relates to apparatuses and methods for providing and generating statistics for images with a formulaic representation.

BACKGROUND

Performing a statistical measurement or analysis on an image involves splitting the image into segments or blocks and then performing statistical measurements/analyses for each segment/block. The measurements may take the form of a summation of pixel values, a summation of the squares of the pixel values, and the like. When performed in conjunction with processing algorithms and hardware, the operations associated with the measurements and calculations may be performed using integer or floating-point formats. Both integer and floating-point formats are limited/constrained by the amount of data that they can reasonably support; e.g., as the amount of data (or, analogously, the number of segments or blocks) associated with an image increases, the data may exceed the capacity of traditional integer or floating-point representations. More generally, increasing the amount of data/number of blocks associated with an image causes an expansion of a footprint (in terms of, e.g., bandwidth, memory, processing resources, etc.) of the platform that is used to process the image, all other conditions being assumed equal. Alternatively, if the footprint is to be maintained, techniques could be applied to reduce the effective amount of data that is used/processed.

BRIEF DESCRIPTION OF THE DRAWINGS

Reference will now be made to the accompanying drawings, which are not necessarily drawn to scale, and wherein:

FIG. 2 depicts pseudo code for processing an image in accordance with aspects of this disclosure.

DETAILED DESCRIPTION

The subject disclosure describes, among other things, illustrative embodiments for processing and analyzing images, and storing data representative of such images in one or more locations of one or more memories or memory devices. Other embodiments are described in the subject disclosure.

One or more aspects of the subject disclosure include, in whole or in part, splitting an image into a plurality of segments, for each segment of the plurality of segments, generating a value that is representative of data of the segment, storing a first part of the value in a first portion of a memory, and storing a second part of the value in a second portion of the memory, the second part being different from the first part.

One or more aspects of the subject disclosure include, in whole or in part, obtaining, via a receiver, an image from a plurality of images (e.g., received images), generating a first value that is representative of first data of a first segment of the image, storing a first part of the first value in a first location of a first memory, and storing a second part of the first value in a first location of a second memory.

One or more aspects of the subject disclosure include, in whole or in part, generating, for a first segment of an image, a first value, storing a first portion of the first value in a first memory and a second portion of the first value in a second memory, subsequent to the storing, reading the second portion of the first value from the second memory, generating, for a second segment of the image, a second value that is based on the second portion of the first value read from the second memory, and storing a first portion of the second value in the first memory and a second portion of the second value in the second memory.

Figure 1A:
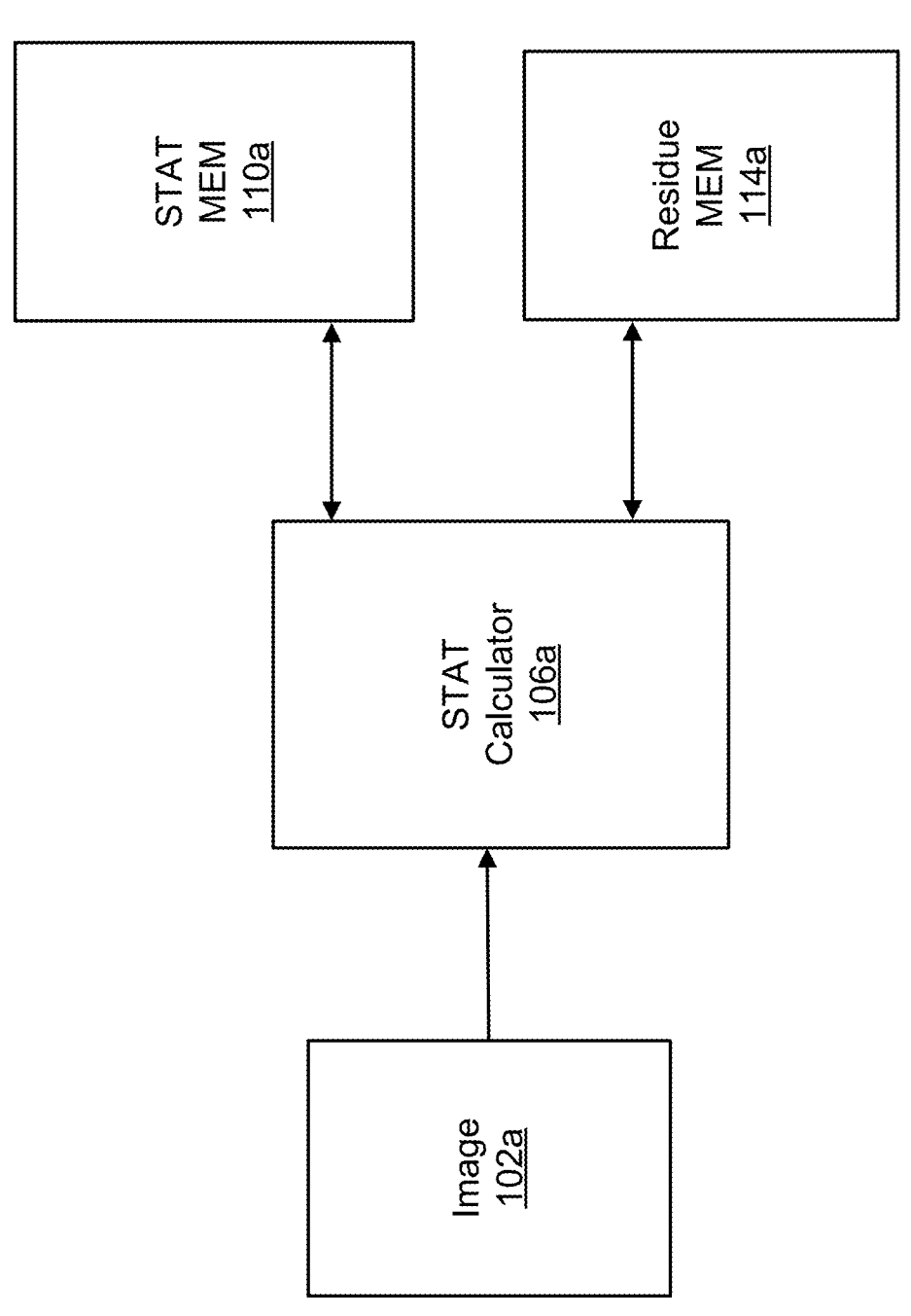
FIG. 1A is a block diagram illustrating an exemplary, non-limiting embodiment of a system for processing an image in accordance with various aspects described herein.

FIG. 1A is a block diagram illustrating an exemplary, non-limiting embodiment of a system $100a$ in accordance with various aspects of this disclosure. Aspects or portions of the system $100a$ may be included or incorporated as part of one or more computing platforms or architectures. For example, aspects of the system $100a$ may be included or associated with a front-end image signal processing (ISP) pipeline. The ISP pipeline may execute one or more algorithms to process an image, such as a still-frame image, an image associated with a video (e.g., a streaming video), or the like.

The system $100a$ is shown in FIG. 1A as including an image $102a$ (which may be representative of a plurality of images, such as for example a stream of images), a statistics (STAT) calculator $106a$, a STAT memory (MEM) $110a$, and a residue MEM $114a$. In operation, the STAT calculator $106a$ may operate upon a block or pixel of the image $102a$ and generate (e.g., accumulate) statistics that may be saved/stored into the STAT MEM $110a$ and a residue/residual that may be saved/stored into the residue MEM $114a$. As would be appreciated by one of skill in the art, the format for a statistical word may correspond to a mantissa or significand and an exponent.

Figure 1B:
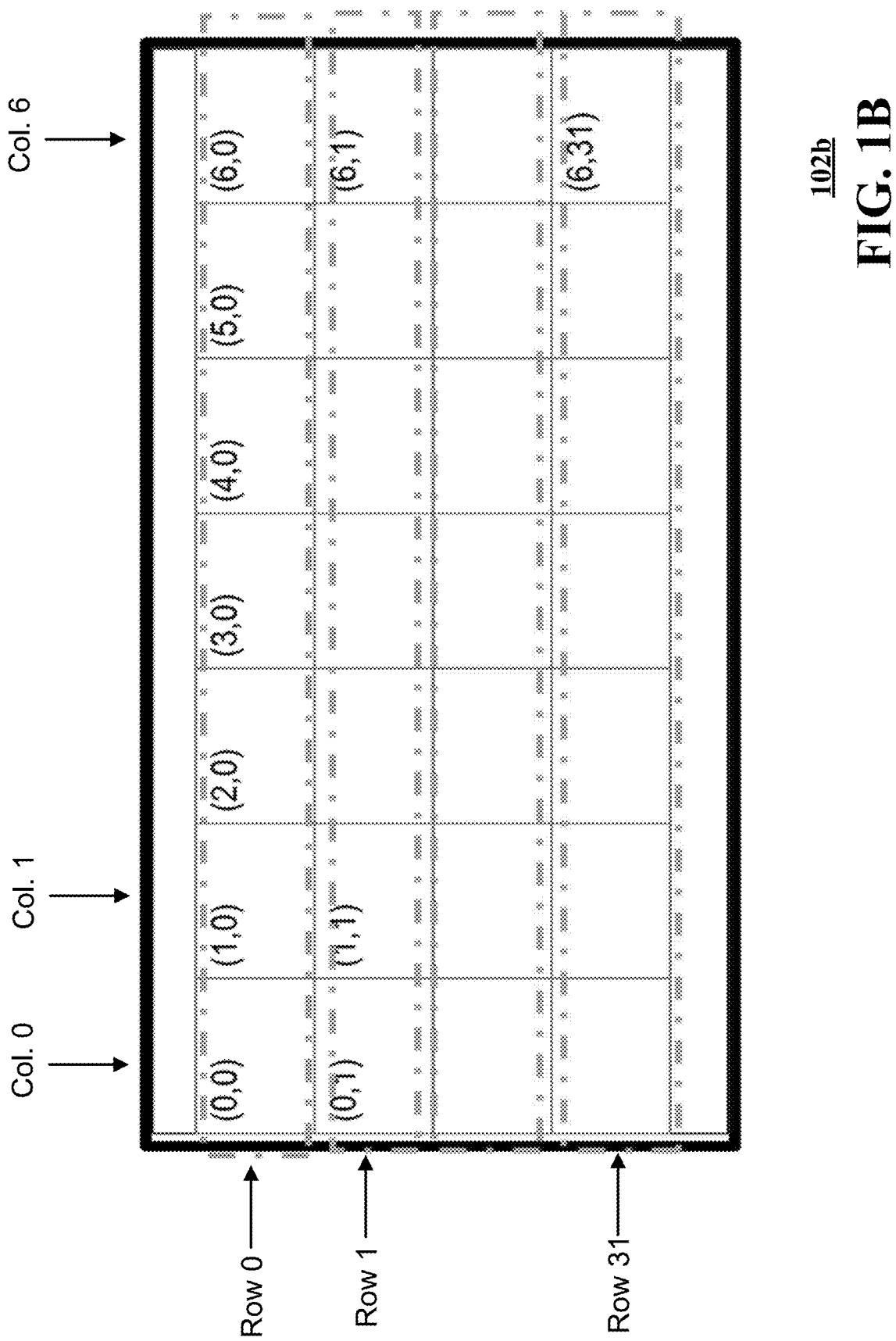
FIG. 1B is a block diagram illustrating a segmentation of an image into blocks arranged as rows and columns in accordance with various aspects set forth herein.

Referring now to FIG. 1B, an example of an image $102b$ that is segmented or partitioned into blocks is shown. In particular, the image $102b$ is shown as having been segmented into a number (e.g., seven) of columns (labeled col. 0 through col. 6) and a number (e.g., thirty-two) of rows (labeled row 0 through row 31), where the intersection or coordinates of a given column and a given row corresponds to a block. The number of columns and rows in FIG. 1B is illustrative, which is to say that a different number of columns and/or a different number of rows may be used for an image in some embodiments. The image $102b$ may correspond to the image $102a$ of FIG. 1A.

Each block of an image (e.g., the image $102b$) may be processed to generate statistics that may be representative of the (pixel) data associated with that block. The statistics may be represented as a value—e.g., a bin value—of the type: $[V_n, V_{n-1}, \ldots V_m, V_{m-1}, \ldots V_3, V_2, V_1, V_0]$. The (bin) value may, in turn, be represented using a formulaic representation corresponding to two parts. A first of the two parts may include a first portion of the (bin) value—e.g., $[V_n, V_{n-1}, \ldots V_m]$—and an exponent (Exp) that may be saved/stored in a STAT MEM (e.g., STAT MEM $110a$ of FIG. 1A). A second of the two parts may include a second portion of the (bin) value—e.g., [$V_{m-1}, \ldots V_3, V_2, V_1, V_0$]—that may be saved/stored in a residue MEM (e.g., residue MEM 114*a* of FIG. 1A).

Referring now to FIG. 2, A pseudo code 200 corresponding to an algorithm that may be executed by, e.g., the STAT calculator 106*a* of FIG. 1A upon an input image (e.g., the image 102*a* of FIG. 1A or the image 102*b* of FIG. 1B) is shown. The code 200 presumes that the input image has been segmented/partitioned into segments/blocks in advance. One skilled in the art will appreciate that the code 200 may be modified/adapted to facilitate such segmentation/partitioning as needed, and that such segmentation/partitioning may be performed by the STAT calculator 106*a* (or any other entity) without departing from the scope and spirit of this disclosure. Further, and as described below, the code 200 is structured as an iterative adder or accumulator; one skilled in the art will appreciate that other types of functionality may be accommodated by merely adapting the code 200 to satisfy particular objectives or purposes. The code 200 may be implemented using any type or kind of programing constructs, languages, and the like, as would be appreciated by one of skill in the art.

The first three lines of the code 200 provide an initialization of the residue MEM and the STAT MEM, and an initialization of a dummy variable (PrevBlkRow) corresponding to a previous block row. Thereafter, the code 200 includes a loop (e.g., a for loop) that is operative for each pixel in the input image. As part of the loop, and at the start of each row, the residue MEM is reinitialized to zero (which is to say that values associated with the residue may be independent from one another amongst/across rows, but may be dependent on one another within a given row). The data from the STAT MEM and the residue MEM may be read into variables [iMant, exp] and Resi, respectively, which in turn is incorporated as part of a variable CurrStat. Thereafter, a function (e.g., an accumulation) is performed upon the value of the CurrStat and the next pixel in the image, resulting in a value for a variable NextStat. Respective portions of the value for NextStat are stored back into the residue MEM and STAT MEM, potentially overwriting pre-existing values in the process. In this manner, an iterative process may be established/utilized to calculate statistical values for a given block, while also reducing the amount of memory that is consumed as part of the process.

Figure 3:
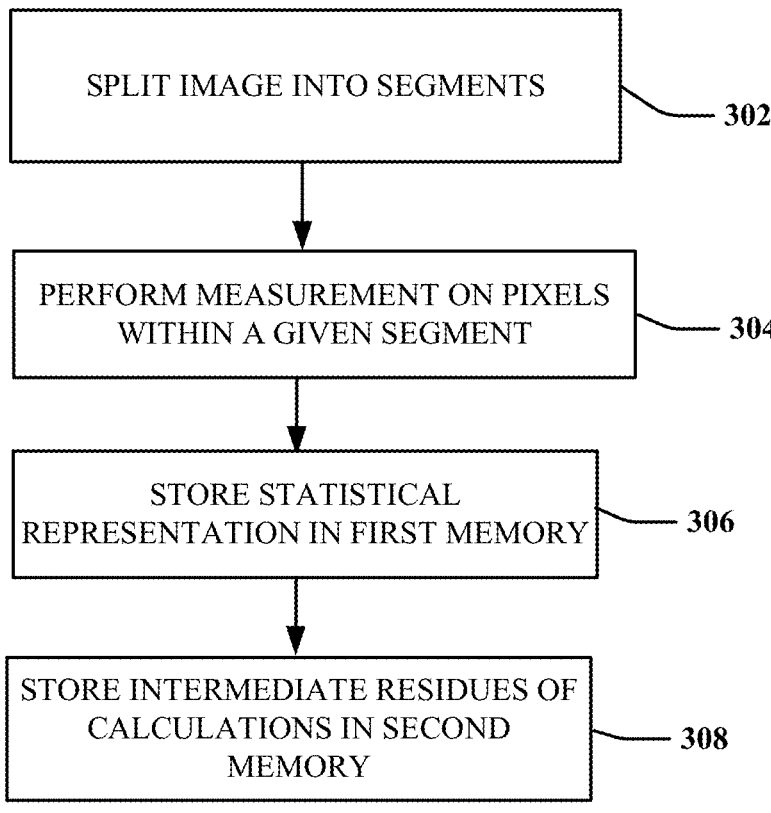
FIG. 3 depicts an illustrative embodiment of a method in accordance with various aspects described herein.

FIG. 3 depicts an illustrative embodiment of a method 300 in accordance with various aspects described herein. The method 300 may be implemented or executed, in whole or in part, in conjunction with one or more processing systems. Each of the processing systems may include one or more processors. The method 300 may facilitate a statistical analysis of an image, which may be operated upon by one or more algorithms to facilitate any number of operations, such as for example modifying a contrast or color associated with the image, resizing the image, etc. Operations associated with the method 300 are described in further detail below in respect of the various blocks shown in FIG. 3.

In block 302, the image may be split into a number of blocks or segments. The number of blocks/segments to use may be associated with a requirement or specification, an amount of processing resources that are available, or other factors or parameters.

In block 304, pixels of the image may be selected in an order (e.g., a raster-scan order) and statistical measurements may be performed on the pixels in accordance with a formulaic representation. For example, block 304 may include a generation of a bin value that may be divided into two parts: a statistical representation (e.g., mantissa and an exponent) and a residue.

In block 306, the statistical representation may be saved/stored in a first memory (e.g., the STAT MEM 110*a* of FIG. 1A). In block 308, the residue may be saved/stored in a second memory (e.g., the residue MEM 114*a* of FIG. 1A). While shown separately, aspects of the block 306 and/or the block 308 may be included/incorporated as part of block 304 in some embodiments. Further, in some embodiments aspects of the method 300, potentially including aspects of blocks 304-308, may be executed iteratively/recursively, such as for example in relation to each block/segment of the image.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
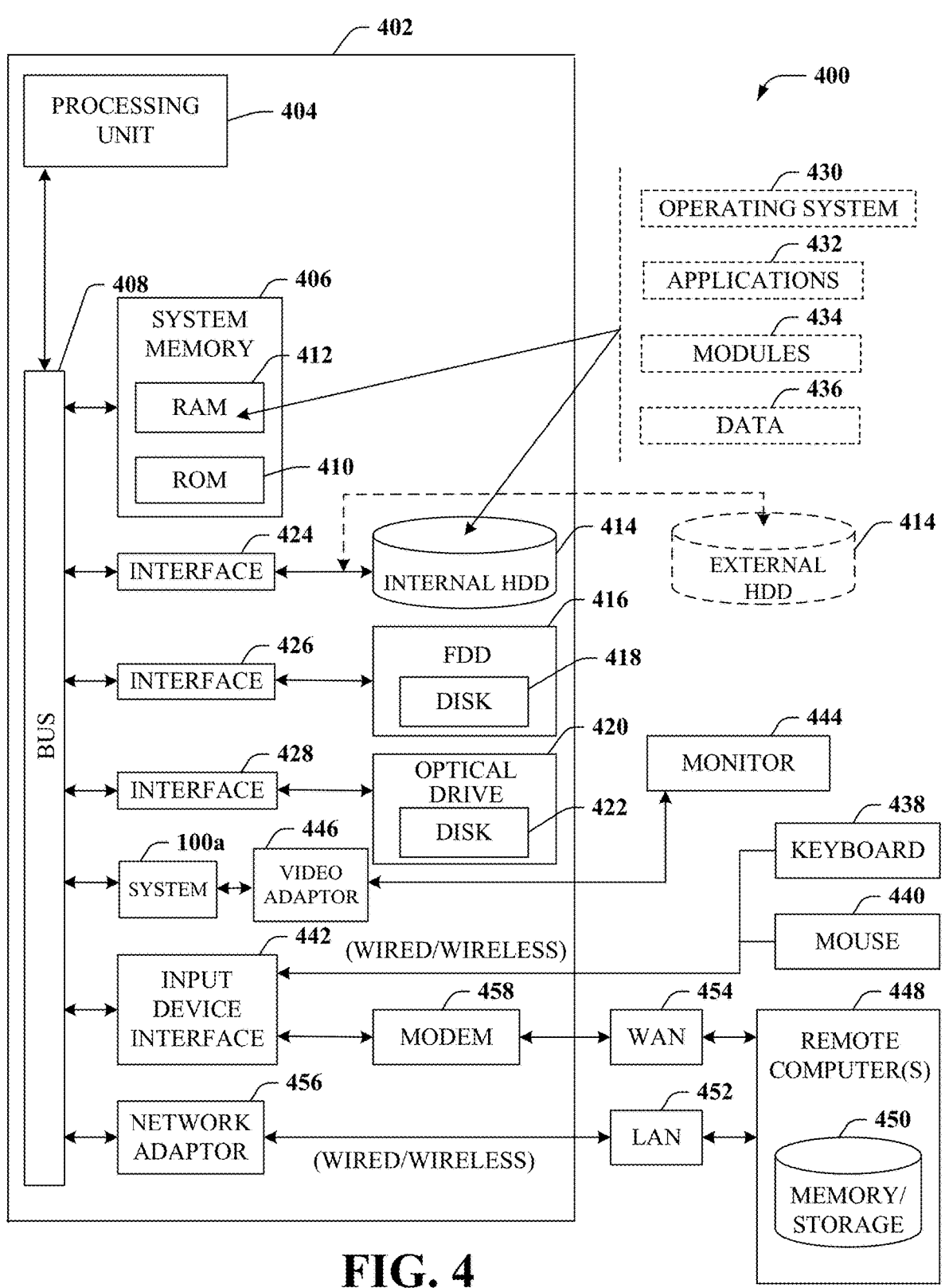
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. Each of the entities shown in FIG. 4 can be implemented via computer-executable instructions that can run on one or more computers, and/or in combination with program modules and/or as a combination of hardware and software. For example, computing environment 400 can facilitate, in whole or in part, portions of the system 100*a* of FIG. 1A for processing an input image. Particularly, the processing unit 404 can be configured to facilitate a processing of an input image of the system 100*a* that may be interfaced to a video adaptor 446. It will be appreciated that aspects of the system 100*a* can be placed in other locations in FIG. 4, and that the computing environment 400 can accommodate images that are different from video, such as still frame images. Furthermore, the video adaptor 446 may encompass pieces of equipment that may be used to capture or distribute images or image data, including for example one or more cameras, video equipment, routers, gateways, modems, switches, etc., or any combination thereof. In this regard, aspects of the video adaptor 446 may provide inputs to the system 100*a* and/or process or manage/handle outputs of the system 100*a* in some embodiments.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory, Flash drive such as a Solid-State Drive (SSD), or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data, Dynamic RAM (DRAM), or combinations thereof.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, a Flash drive such as a Solid-State Drive (SSD), cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as the video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used. The network adaptor 456 and/or the modem 458 may include a transmitter, a receiver, or a combination thereof, that may be used to transmit or receive data.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

As set forth herein, aspects of this disclosure may be included or integrated as part of numerous practical applications. For example, aspects of this disclosure may be included or implemented as part of a statistical/statistics engine that may be operative to analyze or assess parameters associated with an image. Statistics associated with the image may be analyzed by one or more algorithms—e.g., one or more image processing algorithms. Aspects of this disclosure provide for substantial improvements relative to conventional technologies. For example, aspects of this disclosure may consume/utilize a smaller footprint in terms of computing resources (e.g., bandwidth, memory, processing time/power, etc.) for processing data, without any loss in accuracy in respect of the data. While some of the examples set forth herein pertain to image and video processing, aspects of this disclosure may be applied in respect of data associated with other types of applications (e.g., email, text messages, voice data, documents, etc.). Aspects of this disclosure are highly transformative in nature, as raw data (that is potentially representative of an image) is translated into statistical values or measurements that are capable of being operated upon by one or more algorithms or processing systems.

To demonstrate aspects of the foregoing, Table 1 shown below provides, by way of example, an indication of inaccuracies associated with typical processing applications for images using various types of representations and resources that are consumed. More specifically, Table 1 provides for inaccuracies measured in pixels lost per block/segment and resources consumed in terms of a localized memory footprint and a memory footprint associated with a system or system on chip (SoC) implementation. One skilled in the art will appreciate that the values shown in Table 1 are illustrative, which is to say that other values may be utilized without departing from the scope and spirit of this disclosure. What is important to note for purposes of Table 1 is that, relative to the other rows of Table 1, the last row of Table 1 (implementing aspects of this disclosure) provides for no loss of accuracy (e.g., no loss of pixels or a lossless implementation) with as good or better resource consumption (in terms of a reduction of local or SoC memory footprint consumption). In this respect, and as Table 1 demonstrates, aspects of this disclosure represent substantial improvements vis-à-vis conventional technologies/techniques.

TABLE 1

Comparison Of Inaccuracy And Resource Consumption
For Various Types Of Representations

| | Inaccuracy (Pixels lost per block) | Memory Footprint (Local) | Memory Footprint (System/SoC) |
|---|---|---|---|
| 32-bit Single Precision (Floating Point) | 8640 | 4096 bytes | 8 Kbytes |

TABLE 1-continued

Comparison Of Inaccuracy And Resource Consumption
For Various Types Of Representations

| | Inaccuracy (Pixels lost per block) | Memory Footprint (Local) | Memory Footprint (System/SoC) |
|---|---|---|---|
| 32-bit Integer (int) | 17 | 4096 bytes | 8 Kbytes |
| 64-bit Integer (long) | 0 | 8192 bytes | 16 Kbytes |
| 64-bit double precision (Floating Point) | 0 | 8192 bytes | 16 Kbytes |
| This disclosure | 0 | 4112 bytes | 8 Kbytes |

As the foregoing demonstrates, aspects of this disclosure are not directed to abstract ideas. To the contrary, and as one of skill in the art will appreciate, aspects of this disclosure are directed to and encompass significantly more than any abstract idea standing alone. Aspects of this disclosure generate useful, concrete, and tangible results that are integrated as part of numerous practical applications and environments.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

We claim:

1. A method, comprising:
splitting an image that is obtained from a video adaptor into a plurality of segments;
for each segment of the plurality of segments, iteratively generating a value that is representative of data of the segment, the value being used to modify the image;
storing for each iteration a first part of the value in a first portion of a memory; and
storing for each iteration a second part of the value in a second portion of the memory, the second part being different from the first part, the second part being a residual of the value,
wherein different locations of the first portion of the memory stores first part of values for each segment of the image and a location of the second portion of the memory which stores second part of the values for each segment of the image is reused for each segment to reduce an amount of memory for iteratively generating the values of each segment, and wherein for a respective segment, the first part of the value represents data of the respective segment with no loss in accuracy after a plurality of iterations.

2. The method of claim 1, further comprising:
obtaining the image from a stream of images.

3. The method of claim 1, wherein the first part of the value corresponds to a mantissa and an exponent.

4. The method of claim 1, wherein the plurality of segments is arranged as a plurality of rows and a plurality of columns.

5. The method of claim 4, further comprising:
initializing the second portion of the memory for each row of the plurality of rows.

6. The method of claim 1, wherein the value includes a statistical value.

7. The method of claim 1, wherein the generating of the value for each segment comprises identifying a value for each pixel of a plurality of pixels of the segment.

8. The method of claim 1, wherein the generating of the value for each segment comprises summing a plurality of values over the segment.

9. A system comprising:
a receiver configured to receive a plurality of images captured by a video adaptor; and
a processing system configured to:
obtain, via the receiver, an image from the plurality of images;
for each first segment of a plurality of segments of the image, iteratively generate a first value that is representative of first data of a first segment of the image, the first value being used to modify the image;
store for each iteration a first part of the first value in a first location of a first memory; and
store for each iteration a second part of the first value in a first location of a second memory the second part of the first value being a residual of the value;
wherein different locations of the first memory stores first part of first values for each segment of the image and the first location of the second memory which stores second part of the first values for each segment of the image is reused for each segment to reduce an amount of memory for iteratively generating the values of each segment, and wherein for a respective segment, the first part of the first value represents first data of the respective segment with no loss in accuracy after a plurality of iterations.

10. The system of claim 9, wherein the processing system is configured to iteratively generate the first value over pixels of the first segment.

11. The system of claim 9, wherein the processing system is configured to:
generate a second value that is representative of second data of a second segment of the image, the second segment being different from the first segment;
store a first part of the second value in a second location of the first memory that is different from the first location of the first memory; and
store a second part of the second value in the first location of the second memory.

12. The system of claim 11, wherein the first segment and the second segment are included as part of a same row of the image.

13. The system of claim 12, wherein the second part of the second value is dependent on the second part of the first value.

14. The system of claim 11, wherein the first segment is included as part of a first row of the image, and wherein the second segment is included as part of a second row of the image, the second row being different from the first row.

15. The system of claim 14, wherein the second part of the second value is independent of the second part of the first value.

16. A method comprising:

iteratively generating, for a first segment of an image, a first value, wherein the first value is used to modify the image;

storing for each iteration a first portion of the first value in a first memory and a second portion of the first value in a second memory, the second portion of the first value being a residual of the first value;

subsequent to the storing, reading the second portion of the first value from the second memory;

iteratively generating, for a second segment of the image, a second value that is based on the second portion of the first value read from the second memory; and storing for each iteration a first portion of the second value in the first memory and a second portion of the second value in the second memory, the second portion of the second value being a residual of the second value, wherein the first memory stores in different locations the first portions of the values for each segment of the image and a location of the second memory which stores the second portion of the values for each segment is reused for each segment to reduce an amount of memory for iteratively generating the value of each segment, and wherein for the first segment, the first portion of the first value represents data of the first segment with no loss in accuracy after a plurality of iterations.

17. The method of claim 16, wherein the storing of the second portion of the second value in the second memory comprises overwriting the second portion of the first value in the second memory.

18. The method of claim 16, wherein the first segment and the second segment are included as part of a first row in the image.

19. The method of claim 16, further comprising:

receiving the image as part of a stream of images, wherein the stream of images is associated with a video.

* * * * *